(No Model.)

W. P. HATCH.
SHEARS.

No. 401,163. Patented Apr. 9, 1889.

Witnesses
W. Rossiter
Fredk H. Mills

Inventor
Walter P. Hatch
By Penn & Fisher
Attys.

UNITED STATES PATENT OFFICE.

WALTER P. HATCH, OF PULLMAN, ILLINOIS.

SHEARS.

SPECIFICATION forming part of Letters Patent No. 401,163, dated April 9, 1889.

Application filed November 30, 1888. Serial No. 292,310. (No model.)

*To all whom it may concern:*

Be it known that I, WALTER P. HATCH, a citizen of the United States, residing at Pullman, in the county of Cook and State of Illinois, have invented certain new and useful Improvements in Scissors and Shears, of which I do declare the following to be a full, clear, and exact description, reference being had to the accompanying drawings, forming part of this specification.

The object of my present invention is to provide improved means whereby the pivoted blades of shears and scissors can be held closely together and in proper cutting relation, and in which any wear upon the blades or upon the pivot-screw can be readily compensated for, and in which the working of the retaining-nut from the pivot-screw will be avoided. This object of invention I have accomplished by the novel construction hereinafter described, illustrated in the accompanying drawings, and particularly pointed out in the claim at the end of this specification.

Figure 1:
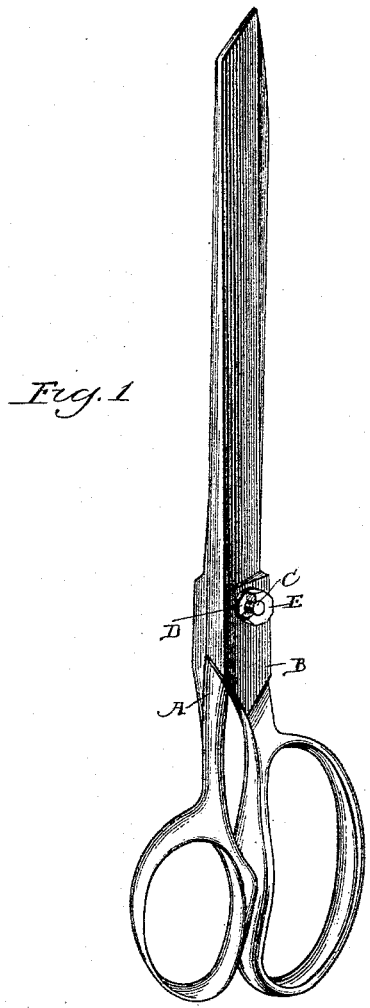
Figure 2:
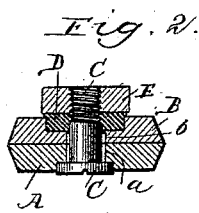

Figure 1 is a perspective view of a pair of shears embodying my invention, parts being broken away for better illustration. Fig. 2 is a view in vertical cross-section through the shears adjacent the pivot-bolt.

A and B denote the two blades of the shears, that may be formed in any well-known or suitable manner. Through these blades are formed the perforations $a$ and $b$, of a size adapted to receive the screw C, that serves to pivotally connect the blades together. The blade A is preferably countersunk on its outer face to receive the head of the screw C, and the blade B is also countersunk to receive the washer D, that encircles the screw, and is held securely in place by means of the nut E, that fits upon the correspondingly-threaded end of the screw. The washer D may be of any suitable material adapted to bind upon the under side of the nut and prevent its turning, although I prefer to employ a washer of india-rubber, leather, or other material having more or less elasticity, and by preference this washer is of such thickness as to extend slightly above the top of the countersunk seat in which it is held. From this construction it will be seen that when the blades A B have been pivotally connected together, as illustrated in the accompanying drawings, the pressure of the nut E upon the washer D forces this washer tightly into the countersunk seat and against the blade B, and consequently holds the blades firmly together and in the most effective manner for the cutting operation, while at the same time permitting the blades to be easily worked. Moreover, this washer D serves to compensate for the wear upon the head of the screw and at the edge of the blades incident to long usage, so that a readjustment of the nut E need be made only at long intervals. So, also, this washer, by reason of its firm bearing in the countersunk seat and of its contact with the under face of the nut E, acts as a lock for such nut and securely guards against its working loose upon the threads in such manner as to permit the blades to loosen or the nut to become lost.

Having thus described my invention, what I claim as new, and desire to secure by Letters Patent, is—

The combination of the blades A and B, the blade B being countersunk adjacent its pivot-hole, a single screw-bolt, C, for pivotally connecting said blades, the nut E upon said screw-bolt, and a washer, D, of rubber, said washer D being located within the countersunk seat of the blade B and bearing against the inner face of the nut E, whereby the screw-bolt C and the nut E are held in fixed relation to the blade B during the operation of the shears, substantially as described.

WALTER P. HATCH.

Witnesses:
GEO. P. FISHER, Jr.,
I. B. CARPENTER.